(12) United States Patent
Blaimschein et al.

(10) Patent No.: US 6,205,370 B1
(45) Date of Patent: Mar. 20, 2001

(54) METHOD OF MAKING A NEST OF CUTS

(75) Inventors: Gottfried Blaimschein, Steyr; Harald Dietachmayr, Ternberg, both of (AT)

(73) Assignee: GFM Beteiligungs-und Management GmbH & Co. KG, Steyr (AT)

( * ) Notice: Subject to any disclaimer, the term of this patent is extended or adjusted under 35 U.S.C. 154(b) by 0 days.

(21) Appl. No.: 09/136,355

(22) Filed: Aug. 19, 1998

(30) Foreign Application Priority Data

Aug. 21, 1997 (AT) .................................................. 1402/97

(51) Int. Cl.[7] .................................................. G06F 19/00
(52) U.S. Cl. .................. 700/134; 700/139; 700/150; 700/161; 700/171; 700/230; 700/259; 700/135; 382/111; 83/936; 83/937; 83/938; 83/939; 83/940; 83/941
(58) Field of Search .................... 700/134, 135, 700/150, 171, 230, 259, 161; 32/111; 83/936–941

(56) References Cited

U.S. PATENT DOCUMENTS

| 4,725,961 | * | 2/1988 | Pearl | 700/196 |
| 4,982,437 | * | 1/1991 | Loriot | 382/8 |
| 5,089,971 | * | 2/1992 | Gerber | 700/139 |
| 5,258,917 | * | 11/1993 | Bruder et al. | 700/171 |
| 5,953,232 | * | 9/1999 | Blaimschein | 700/171 |

FOREIGN PATENT DOCUMENTS

| 40 12 462 | 4/1992 | (DE) . |
| 0 750 048 | 12/1996 | (EP) . |
| 0 762 251 | 3/1997 | (EP) . |

* cited by examiner

Primary Examiner—Ayaz R. Sheikh
Assistant Examiner—Frantz Blanchard Jean
(74) Attorney, Agent, or Firm—Collard & Roe, P.C.

(57) ABSTRACT

For making a nest of cuts (N) for cutting blanks out of flat, irregular workpieces (W), the contour (U) and the flaws (F) of the spread workpieces (W) together with a workpiece characteristic are detected by means of a digitizing unit (3), and the corresponding data are read into a computer (5), which on the basis of these data and the data stored in the computer (5) concerning number, shape and quality requirements of the blanks calculates and stores a nest of cuts and utilizes the detected workpiece characteristics of the workpieces (W) as a workpiece code for allocating the nests of cuts (N) to the respective workpieces (W). To provide for an economic nesting with an optimized detection of flaws and consideration of flaws, an interactive nesting is performed for selected partial areas (T) of the workpieces (W) prior to the automatic nesting on the part of the computer, in that images (B) of the blanks (Z) to be nested, which were provided by the computer (5) and can optically be superimposed on the workpieces (W) or an image of the workpieces, are positioned by specific control operations of the nester, preferably by control operations to be recognized by the digitizing unit, and are combined to partial nests (Nt) within the partial areas (T), whereupon the computer (5) calculates residual nests (Nr) for the remaining residual areas (R) of the workpieces (W), combines the residual nests (Nr) with the associated partial nests (Nt) and stores each of these combinations of partial and residual nests as nest of cuts (N) for the individual workpieces (W).

7 Claims, 1 Drawing Sheet

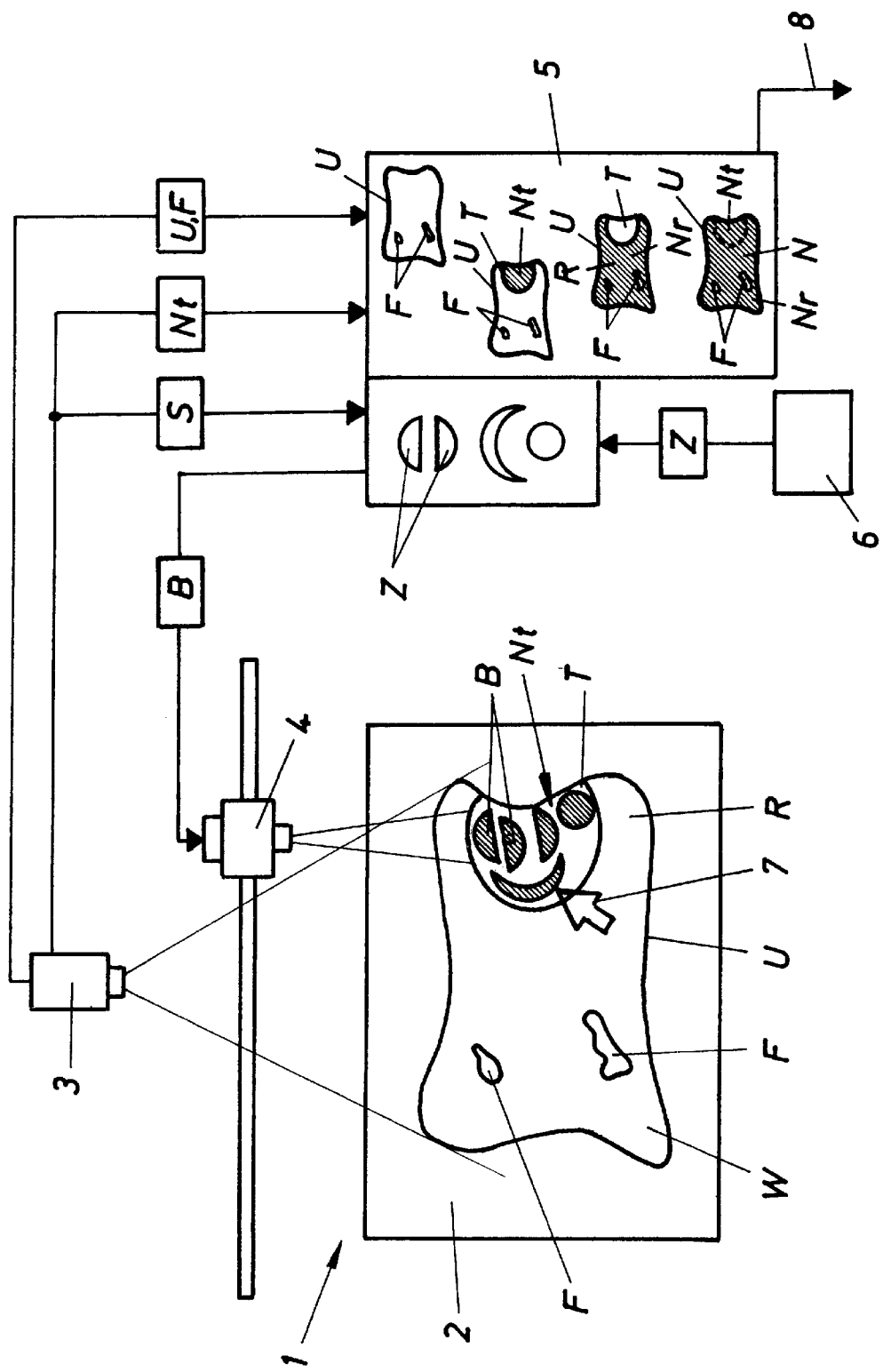

METHOD OF MAKING A NEST OF CUTS

This invention relates to a method of making a nest of cuts for cutting blanks out of flat, irregular workpieces, in particular leather skins, where the contour and the flaws of the workpieces spread on a supporting surface of a receiving means together with a workpiece characteristic and workpiece-specific quality features are detected by means of a digitizing unit, and the corresponding data are read into a computer, which on the basis of these data and the data stored in the computer concerning number, shape and quality requirements of the blanks calculates and stores a nest of cuts and utilizes the detected workpiece characteristics of the workpieces as a workpiece code for allocating the nests of cuts to the respective workpieces.

When cutting out blanks from leather pieces or other irregular flat pieces on an industrial scale, there should not only be achieved an optimum utilization of material, but also an economic nesting, where nesting is understood to be a combination of various blanks to a pattern individually adjusted to the respective workpiece in consideration of workpiece flaws such as holes, surface structure and color, stretching direction or the like. For automating such nesting it is known in accordance with U.S. Pat. No. 4,725,961 to digitize the contour of the workpiece by means of a computer and optically display the same on the screen of a layout unit, so that on the screen an interactive nesting can be effected by means of stored blanks. However, there is missing any direct relation of the nester to the skin, which along with the difficulty in optically detecting flaws and the like leads to unsatisfactory results and due to the necessity of interactively nesting all blanks also involves a lengthy nesting operation.

Corresponding to the DE-C-40 12 462, the U.S. Pat. No. 4,982,437 and the U.S. Pat. No. 5,089,971 it has also already been proposed to optically detect and digitize contour and flaws of a workpiece and for the preparation of a blank by calculation enter the corresponding data in a computer additionally fed with data concerning the blanks, where flaws and other quality features can also be marked manually for a better detection, and a detected workpiece characteristic of a workpiece can serve as workpiece code for the allocation of the calculated pattern to the respective workpiece for the subsequent cutting operation. In this case, however, the nest of cuts is prepared by the computer only for that workpiece area which the computer can recognize as free from flaws due to a marking or the optical resolution, so that above all workpiece areas having hardly recognizable flaws or quality deficiencies are disregarded and either by means of an extensive marking are excluded from the nest area in an uneconomic way, or by including them in the nest area can lead to rejects of the blanks.

In accordance with a further known computer-aided nesting the blanks are projected onto the workpiece by means of a projector connected to a computer, so that in the case of an up-right contact with the workpiece nesting can be effected interactively by manually controlling the projections and reading the workpiece-related position of the projections into the computer. The contact with the workpiece enables the nester himself to detect flaws and perform the nesting operation in consideration of such flaws, but due to the necessity of an interactive nesting of all parts such nesting is again rather time-consuming. In addition, there are illumination problems, as on the one hand the optical detection of the workpiece requires a bright enough illumination, but the projection of the blanks requires some darkening, which makes the detection of flaws more difficult for the nester and constitutes a health risk for his eyes due to the frequent change between bright and dark.

It is therefore the object underlying the invention to provide a method as described above, which ensures an economic nesting of the blanks by optimizing the detection and consideration of occurring flaws of the workpieces.

This object is solved by the invention in that before the automatic nesting on the part of the computer, nesting is effected interactively for selected partial areas of the workpieces, in that images of the blanks to be nested, which were provided by the computer and can optically be superimposed on the workpieces or an image of the workpieces, are positioned by specific control operations of the nester and are combined to partial nests within the partial areas, whereupon the computer calculates residual nests for the remaining residual areas of the workpieces, combines the residual nests with the associated partial nests and stores each of these combinations of partial and residual nests as nest of cuts for the individual workpieces.

When making the nest of cuts both the human capacities in the detection of flaws and the mathematical perfection of an automatic nesting can thus be utilized, and a cooperation of these two components optimally adjusted to the respective workpieces can be effected. When the nester detects areas in a spread workpiece with flaws or deficiencies that are hard to detect for the digitizing unit, he can nest interactively for these selected partial areas, where the computer provides suitable images of the blanks and superimposes the same on the workpiece or an image of the workpiece, and the nester brings these images in the desired nest position by means of specific control measures while maintaining the direct workpiece relation, and composes a partial nest which is specific for the selected partial area. This partial nest is stored in the computer, which then makes a residual nest for the remaining residual area of the flaws defined by the contour of the workpiece, the partial areas themselves and the flaws recognized by the computer and possibly marked in addition by the nester, so that by combining partial and residual nests for each workpiece a perfect nest of cuts is obtained, which together with the required workpiece characteristics is stored as workpiece code. For a subsequent cutting operation this nest of cuts then forms the basis for preparing a cutting program for cutting the blanks out of the associated workpiece to be identified by means of the workpiece code, where the workpiece contour and/or the marked flaws may very well serve as workpiece characeristics. The deliberate cooperation of interactive nesting and automatically calculated nesting leads to a quick nesting operation that minimizes the waste of material and optimally takes into account the specific properties of the workpiece.

It is particularly advantageous when in addition to the workpiece-related features also control means (e.g. the hand of a nester or manually operated sensors) provided on and/or above the workpiece and the control movements thereof can be detected by means of the digitizing unit and the data thus obtained can be transmitted to the computer, which provides the images of the blanks in dependence on these control data, superimposes the same on the workpiece or an image of the workpiece, positions the same and fixes the same in their position relative to the respective workpiece. In accordance with the invention, the digitizing unit, which may have an optical camera or another suitable scanner, is no longer merely used for recording the workpiece-related data concerning contour, flaws and the like characteristics and features, but at the same time becomes the control member for the interactive nesting, in that control means or control movements adjusted to the respective digitizing unit are used by the nester for displaying the partial area to be nested interactively, for displaying the blanks, for selecting and positioning these images, or for other measures facilitating the interactive nesting. The nester remains in contact with the workpiece, he can move and adjust control means on the workpiece, the movements themselves can be detected as control movements and be used for control purposes, and all kinds of control measures known in conjunction with electronic data processing can be applied, where above all the hand of the nester himself can be utilized as control means or part or support of control means, and movements of the hand can be utilized as control movements. It is thus for instance possible to project images of the blanks onto the workpiece, to identify a certain image of the same by the nester reaching into the same with his hand, and then to move and position this image by a movement of the hand, which provides for a skilful and quick interactive nesting.

One possibility of digitizing and image processing consists in the combination of camera and projector, where expediently the images of the blanks are projected onto the workpieces as dark points of a light field. This provides for a bright enough illumination of the workpiece for digitizing purposes and for the detection of flaws, and the projection of the blanks nevertheless leads to clearly visible images, which as dark points stand out well against the brightly illuminated surroundings and can exactly be positioned. In addition, great differences in brightness are avoided for the nester, as the projection of the dark points only slightly influences the total brightness for the eye of the nester.

It is of course also possible to virtually produce the images for the nester in the vicinity of the surface of the workpieces, so that nesting is effected by a fictitious positioning of the images, for which purpose all known means and methods of modern data and image processing and of virtual image technology may be used, in order to simplify the interactive virtual nesting for the nester.

Another possibility of providing the nester with images of the blanks in conjunction with the workpiece is obtained in that, as is known per se, the workpieces, in particular selected partial areas of the workpieces, are displayed on a screen, onto which the images of the blanks are also transmitted, so that nesting can be effected by moving the images of the blanks on the screen. The screen will be disposed in the vicinity of the workpiece, so that the nester does not lose contact with the workpiece and control operations can be effected for nesting by means of the digitizing unit. An interactive nesting might of course also be effected by touching a touch-sensitive screen beside or above the workpiece.

It is advantageous when the partial areas of the workpieces to be displayed on the screen are selected by means of control data of the digitizing unit read into the computer. Since the partial areas of the workpieces in which partial nests should be made have flaws that can hardly be recognized by the digitizing unit, localizing these partial areas by merely displaying them on a screen is hardly possible, so that the selection of these partial areas is in turn quickly and reliably effected by means of the digitizing unit and suitable control means and movements, for instance the hand of the nester equipped with suitable sensors or the like. When the partial area of the workpiece is displayed on the screen, the interactive partial nesting can immediately be effected by specific control operations, for instance again in the form of movements of the hand of the nester, directly in the vicinity of the workpiece surface, where the superposition of the blank images is only effected on the screen and not directly on the workpiece itself. It is, however, also possible that the blank images, which on the screen have been superimposed on the image of the workpiece, are superimposed in some other way, for instance by touching the screen or with some other control means.

Since for the purpose of interactive nesting, the partial area of the workpiece to be nested should in many cases lie within the reach of the nester, the workpieces can be spread in accordance with another embodiment of the invention on a supporting surface formed by a conveyor and can be moved across a receiving field by certain clocked conveying steps, where the workpiece areas lying in the receiving field with each conveying step are detected individually and possibly subjected to an interactive partial nesting, and where finally the computer combines all workpiece areas of a workpiece to a total workpiece, calculates the associated residual nest and upon combination with the partial nests stores the nest of cuts prepared. Above all in the case of larger workpieces, the nesting operations can thus be effected step by step, in which conveying steps a partial nesting can also be effected if necessary. The computer then finally combines all partial areas or workpiece areas corresponding to the conveying steps and processes the same to obtain a common nest of cuts. Advantageously, the conveying steps are made overlappingly, so as the facilitate the mutual allocation of the workpiece areas for the computer on the basis of the overlapping parts.

In the drawing, the subject-matter of the invention is represented in detail by way of example with reference to a schematic illustration of the system.

For making a nest of cuts for cutting blanks out of flat, irregular workpieces, in particular leather skins, there is provided a receiving means 1 with a supporting surface 2 for the workpieces W, a camera 3 as digitizing unit for the detection of workpieces, a projector 4 for projecting images of the blanks as well as a computer 5 with a suitable arithmetic unit and a memory unit, which is connected on the one hand with the camera 3 and the projector 4 and on the other hand with an input means 6 for entering the data concerning the blanks and the like and with a control means 7, for instance a sensor to be moved by the hand of a nester, for the interactive intervention. A merely indicated control line 8 extends from the computer 5 to a cutting means not represented in greater detail.

The available workpieces W are individually laid onto the supporting surface 2 of the receiving means 1 and their flaws F and possibly other workpiece-specific quality features and a workpiece characteristic are manually marked by the nester, whereupon the contour U of the workpiece W as well as the flaws F and other optically detectable deficiencies and additional markings and characteristics are detected by the camera 3, and the corresponding data are read into the computer 5 and stored. When the nester additionally detects a partial area T of the workpiece W with optically hardly detectable deficiencies or the like, he selects this partial area T and interactively prepares a partial nest Nt for this partial area, for which purpose he performs specific control operations by means of the control means 7 for positioning within the partial area T the images B of the blanks Z previously entered into the computer, which were provided to the computer 5 by means of the projector 4, and for combining the same to the partial nest Nt. These images B are for instance projected by the projector 4 onto the workpiece W as dark points of a light field. The control operations are likewise detected by the camera 3 and read into the computer 5 as control data S, so that the digitizing unit is at the same time utilized as control member for the interactive nesting.

When the partial nest has been composed, it is stored in the computer 5, which for the remaining residual area R of the workpiece now calculates a residual nest Nr in consideration of the partial area T and the flaws F or the workpiece contour U and other markings and recognizable deficiencies, combines partial nest Nt and residual nest Nr and stores this combination of partial nest and residual nest as nest of cuts N for the workpiece W. During a subsequent cutting operation a corresponding cutting means can then be activated via the control line 8 by the computer 5 according to a cutting program, which has been prepared on the basis of the nest of cuts associated to the respective workpiece.

What is claimed is:

1. A method of making a nest of cuts for cutting blanks out of flat, irregular workpieces, in particular leather skins, where the contour and the flaws of the workpieces spread on the supporting surface of a receiving means together with a workpiece characteristic and workpiece-specific quality features are detected by means of a digitizing unit, and the corresponding data are read into a computer, which on the basis of these data and the data stored in the computer concerning number, shape and quality requirements of the blanks calculates and stores a nest of cuts and utilizes the detected workpiece characteristics of the workpieces as a workpiece code for allocating the nests of cuts to the respective workpieces, characterized in that before the automatic nesting on the part of the computer nesting is effected interactively for selected partial areas of the workpieces, in that images of the blanks to be nested, which were provided by the computer and can optically be superimposed on the workpieces or an image of the workpieces, are positioned by specific control operations of the nester and are combined to partial nests within the partial areas, whereupon the computer calculates residual nests for the remaining residual areas of the workpieces, combines the residual nests with the associated partial nests and stores each of the combinations of partial and residual nests as nest of cuts for the individual workpieces.

2. The method as claimed in claim 1, characterized in that in addition to the workpiece-related features control means provided on and/or above the workpiece and the control movements thereof are detected by means of the digitizing unit, and the data thus obtained are transmitted to the computer, which provides the images of the blanks in dependence on these control data, superimposes the same on the workpiece or an image of the workpiece, positions the same and fixes the same in their position relative to the respective workpiece.

3. The method as claimed in claim 1, characterized in that the images of the blanks are projected onto the workpieces as dark points of a light field.

4. The method as claimed in claim 1, characterized in that the images for the nester are produced virtually in the vicinity of the surface of the workpieces.

5. The method as claimed in claim 1, characterized in that the workpieces, in particular selected partial areas of the workpieces, are displayed on a screen, onto which the images of the blanks are transmitted in addition.

6. The method as claimed in claim 5, characterized in that the partial areas of the workpieces to be displayed on the screen are selected by means of control data of the digitizing unit read into the computer.

7. The method as claimed in claim 1, characterized in that the workpieces are spread on a supporting surface formed by a conveyor and moved across a receiving field by certain clocked conveying steps, that the workpiece areas lying in the receiving field with each conveying step are detected individually and are possibly subjected to an interactive partial nesting, and that finally the computer combines all workpiece areas of a workpiece to a total workpiece, calculcates the associated residual nest and upon combination with the partial nests stores the prepared nest of cuts.

* * * * *